United States Patent
Hashizume et al.

(10) Patent No.: US 9,981,724 B2
(45) Date of Patent: May 29, 2018

(54) SMALL BOAT EMERGENCY STOP APPARATUS

(71) Applicant: Honda Motor Co., Ltd., Tokyo (JP)

(72) Inventors: Takashi Hashizume, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/448,320

(22) Filed: Mar. 2, 2017

(65) Prior Publication Data
US 2017/0253310 A1 Sep. 7, 2017

(30) Foreign Application Priority Data
Mar. 7, 2016 (JP) .................................. 2016-043019

(51) Int. Cl.
| | |
|---|---|
| *G05D 3/00* | (2006.01) |
| *B63C 9/00* | (2006.01) |
| *H04B 1/3827* | (2015.01) |
| *H04B 17/318* | (2015.01) |
| *B63H 20/00* | (2006.01) |
| *B63H 21/21* | (2006.01) |
| *B63H 21/14* | (2006.01) |

(52) U.S. Cl.
CPC ............ *B63C 9/0011* (2013.01); *B63H 20/00* (2013.01); *B63H 21/14* (2013.01); *B63H 21/21* (2013.01); *H04B 1/385* (2013.01); *H04B 17/318* (2015.01); *B63B 2201/16* (2013.01); *B63B 2758/00* (2013.01); *B63H 2021/216* (2013.01)

(58) Field of Classification Search
CPC ...... B63C 9/0011; H04B 17/318; B63H 20/00
See application file for complete search history.

(56) References Cited

U.S. PATENT DOCUMENTS

| | | | | |
|---|---|---|---|---|
| 2008/0040029 A1* | 2/2008 | Breed | ................. | B60N 2/2863 701/514 |
| 2009/0048750 A1* | 2/2009 | Breed | .................. | G08G 1/161 701/70 |

FOREIGN PATENT DOCUMENTS

JP           62187693 A      8/1987

* cited by examiner

*Primary Examiner* — Adam M Alharbi
(74) *Attorney, Agent, or Firm* — Duft Bornsen & Fettig LLP (57) ABSTRACT

In a small boat emergency stop apparatus having an operator's cockpit and a passenger seat installed spaced apart from the cockpit, there are provided with an operator transmitter wearable by the operator to transmit a radio-wave signal of a predetermined strength, a passenger transmitters wearable by the passenger to transmit a radio-wave signal of the same predetermined strength and a receiver installed at a location closer to the cockpit than the passenger seat to receives the radio-wave signals transmitted by the operator and passenger transmitters successively. It is identified which of the operator and the passenger is a wearer of the transmitter and is then discriminated whether strength of the radio-wave signal transmitted from the identified wearer is smaller than a predetermined value. When it is, it is discriminated that emergency occurred in the wearer and an emergency action of engine stopping or engine speed reducing is performed.

16 Claims, 6 Drawing Sheets

SMALL BOAT EMERGENCY STOP APPARATUS

CROSS-REFERENCE TO RELATED APPLICATIONS

This application is based upon and claims the benefit of priority from Japanese Patent Application No. 2016-043019 filed on Mar. 7, 2016, the contents of which are incorporated herein by reference.

BACKGROUND OF THE INVENTION

Field of the Invention

This invention relates to an emergency stop apparatus of a small boat such as a motorboat.

Description of Related Art

A general practice in motorboats and other small watercraft is for the operator to wear an emergency stop device on the arm that comprises a cord (called a curl cord lanyard) connected to a conductor pin inserted into the ignition circuit of the outboard motor engine, so that if the operator should fall into the water his or her weight automatically disengages the conductor pin and thus stops the engine.

In addition, an arrangement is also known that requires all operator and passengers to wear radio transmitters and that stops the boat when an onboard receiver detects a change in the transmitted radio wave because a wearer fell overboard.

However, there may occur problem of the emergency stop feature not working owing to, for example, the power or a switch of a radio transmitter being inadvertently being left OFF. In order to cope with the problem, Japanese Unexamined Patent Publication No. Sho 62(1987)-187693 proposes to disable transmission from the radio transmitter both during charging and upon occurrence of an emergency on the boat such as man falls overboard.

SUMMARY OF THE INVENTION

Although the aforesaid configuration enables the technology of the reference to deal with failure of emergency stop function when, for instance, the power switch of a radio transmitter is inadvertently left off, its sole response of merely stopping the engine when an emergency occurs is hardly adequate.

An object of this invention is therefore to solve this shortcoming by providing a small boat emergency stop apparatus that responds appropriately upon discriminating whether an emergency was experienced by the operator or by a passenger.

In order to achieve the object, this invention provides an apparatus and method for a small boat having an outboard motor mounted on a hull and equipped with an internal combustion engine to power a propeller to propel the hull forward, a cockpit installed in the hull for seating an operator, and a passenger seat installed in the hull at a position spaced apart from the cockpit for seating a passenger, there are provided with an operator transmitter wearable by the operator to transmit a radio-wave signal of a predetermined strength, a passenger transmitters wearable by the passenger to transmit a radio-wave signal of the same predetermined strength and a receiver installed on the hull at a location closer to the cockpit than the passenger seat to receives the radio-wave signals transmitted by the operator and passenger transmitters successively. It is identified which of the operator and the passenger is a wearer of the transmitter that transmits the radio-wave signal and is then discriminated whether strength of the radio-wave signal transmitted from the identified wearer is smaller than a predetermined value. When strength of the radio-wave signal is smaller than the predetermined value, it is discriminated that the emergency occurred in the identified wearer and an emergency action of an engine stopping or engine speed reducing is performed.

BRIEF DESCRIPTION OF THE DRAWINGS

The objects, features, and advantages of this invention will become cleaner from the following description of embodiments in relation to the attached drawings, in which.

DESCRIPTION OF EMBODIMENT

A small boat emergency stop apparatus according to an embodiment of this invention will be explained with reference to the attached drawings.

Figure 1:
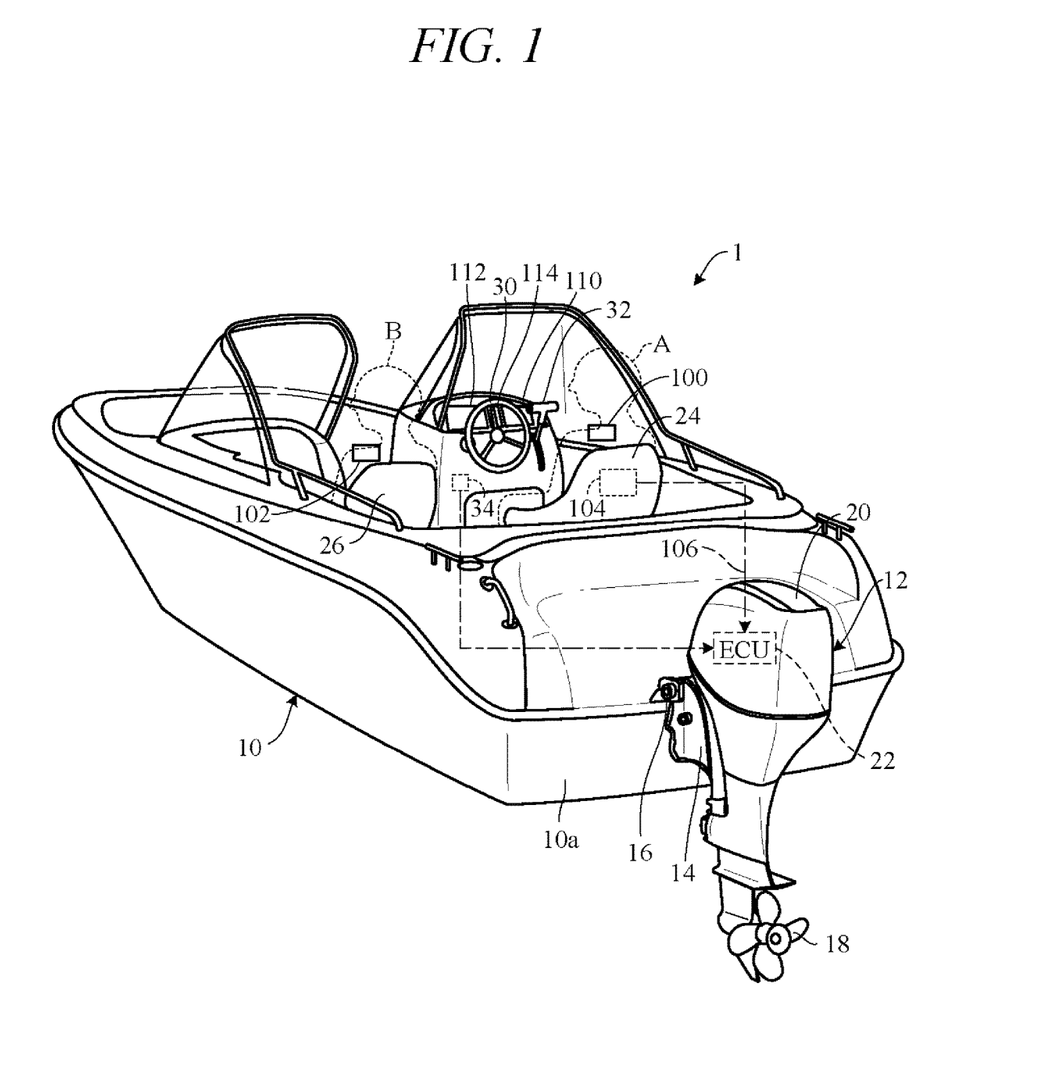
FIG. 1 is an overall schematic view of a boat to which a small boat emergency stop according to the embodiment of this invention is applied.

FIG. 1 is an overall schematic view of a boat to which the small boat emergency stop apparatus according to the embodiment of this invention is applied.

In FIG. 1, symbol 1 indicates a small boat (hereinafter referred to as "boat") mounted with an outboard motor 12 on its hull 10. The outboard motor 12 is clamped to a stern or transom 10*a* of the hull 10 with stern brackets 14 and a tilting shaft 16.

The outboard motor 12 has an internal combustion engine (not shown in FIG. 1, hereinafter referred to as "engine"), a propeller 18 driven by the engine, and an engine cover 20 covering the engine. The engine cover 20 accommodates an Electronic Control Unit (hereinafter referred to as "ECU") 22 in its interior space (engine room) in addition to the engine. The ECU 20 has a microcomputer comprising a CPU, ROM, RAM and other devices, and functions as the apparatus for controlling operation of the outboard motor 12.

A cockpit 24 is provided at a middle position in the hull 10 for seating a boat operator (operator) A (depicted by dotted lines) of the boat 1 and a passenger seat 26 is provided at a position spaced apart from the cockpit 24 in the hull 10 for seating a passenger B (also depicted by dotted lines) of the boat. In addition, second and third passenger seat (not shown) are provide at the rear of the cockpit 24 and passenger seat 26 for seating additional third and fourth passengers.

A steering wheel 30 is installed near the cockpit 24 to be rotatably manipulated by the operator A. A shift/throttle lever (shift lever) 32 is also installed near the cockpit 24 to be manipulated by the operator. The shift/throttle lever 32 is adapted to be moved or swung in front-back direction from its initial position and to be used by the operator to input shift instructions (shift change instructions to forward, reverse or neutral) and engine speed instructions (acceleration/deceleration instruction to the engine).

A GPS receiver 34 is provided at an appropriate location of the hull 10 to receive Global Positioning System signals and outputs signals indicative of the positional information of the boat 1 obtained from the GPS signals to the ECU 22.

Figure 2:
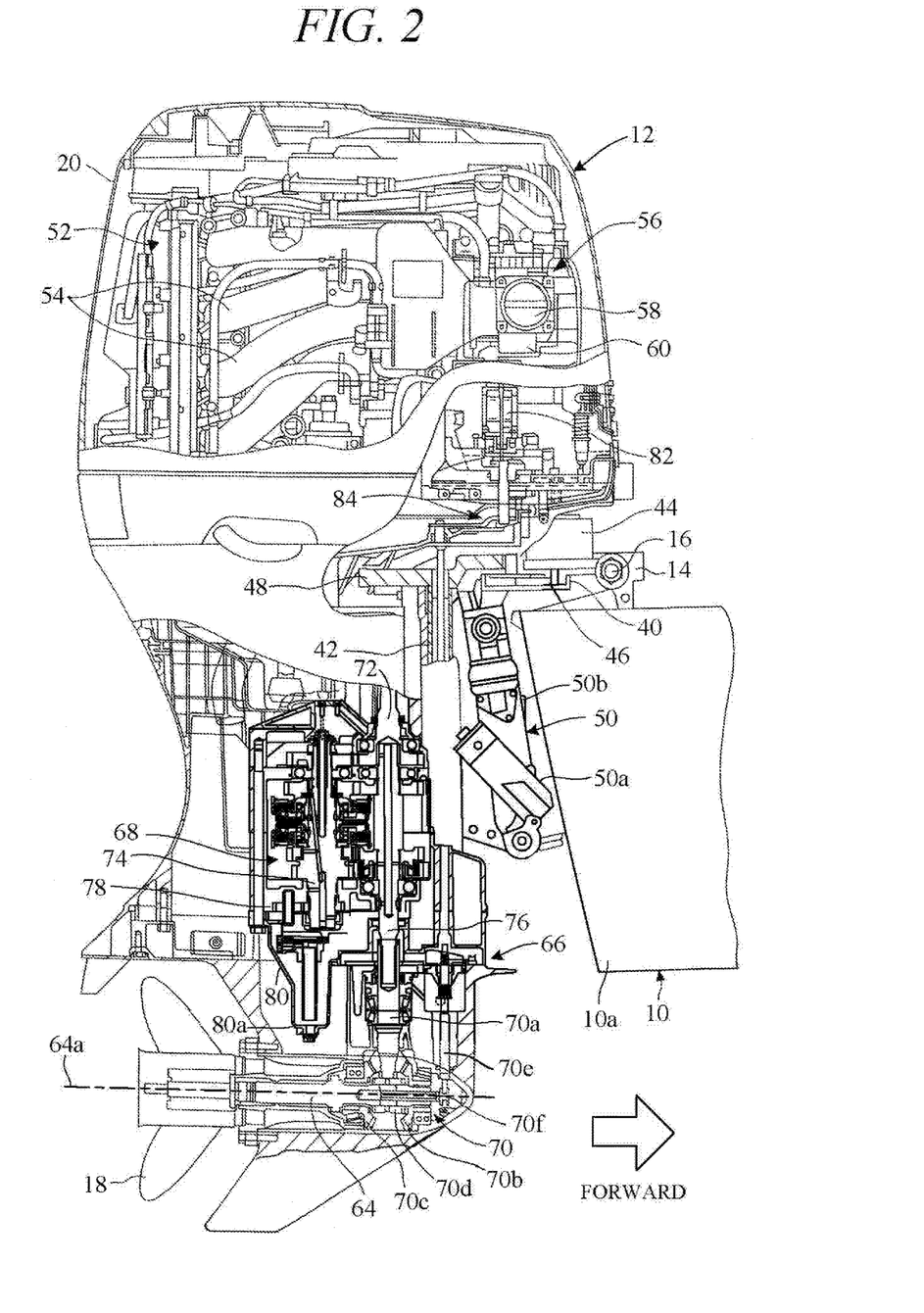
FIG. 2 is an enlarged sectional side view showing an outboard motor installed on the boat shown in FIG. 1.
Figure 3:
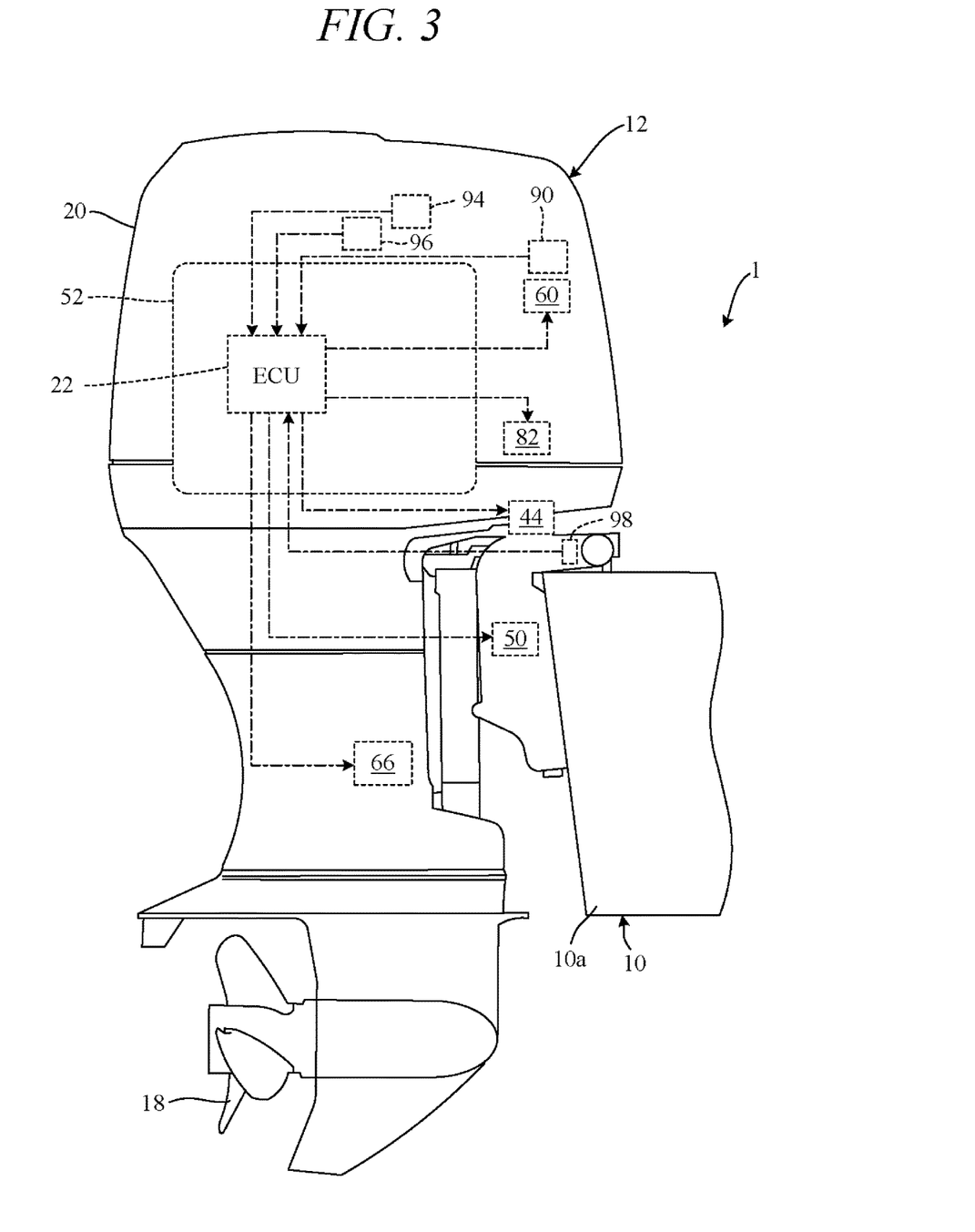
FIG. 3 is an enlarged side view of the outboard motor shown in FIG. 2.

FIG. 2 is an enlarged sectional side view showing the outboard motor 12 of FIG. 1 and FIG. 3 is an enlarged side view of the outboard motor 12.

As shown in FIG. 2, the outboard motor 12 is provided with a shaft unit 42 accommodated inside a swivel case 40 to be rotatable about a vertical-axis, and an electric turning motor 44 for driving the shaft unit 42 through a speed reduction gear mechanism 46 and a mount frame 48. With this, the outboard motor 12 is rotated to the left or right about the shaft unit 42 by rotating the shaft unit 42 with the electric turning motor 44.

A power tilt/trim unit 50 is installed near the swivel case 40. The power tilt/trim unit 50 is adapted to regulate a tilt/trim angle of the outboard motor 12 relative to the hull 10 by tilting up/down or trimming up/down the outboard motor 12. The power tilt/trim unit 50 is integrated with a hydraulic cylinder 50a/50b for regulating the tilt/trim angle. The swivel case 40 is adapted to be rotated about tilting shaft 16 by extending or contracting the hydraulic cylinder 50a/50b to tilt/trim up or down the outboard motor 12. The hydraulic cylinders 50a and 50b are connected to a hydraulic circuit (not shown) of the outboard motor 12 and are extended or contracted when supplied with hydraulic oil (pressure).

The outboard motor 12 is provided with the aforesaid engine (now assigned with reference numeral 52) at its upper portion. The engine 52 comprises a spark-ignition water-cooled gasoline engine with a displacement of 2,200 cc. The engine 52 is located above the water surface and is covered by the engine cover 20.

A throttle body 56 is connected to an air intake pipe 54 of the engine 52. The throttle body 56 has a throttle valve 58 installed therein and is integrated with an electric throttle motor 60 for opening and closing the throttle valve 58.

An output shaft of the electric throttle motor 60 is connected to the throttle valve 58 through a speed reduction gear mechanism (not shown). With this, the throttle valve 58 is opened or closed by operating the throttle motor 60 and thereby regulating the flow of intake air to the engine 52 to control an engine speed.

The outboard motor 12 is provided with a propeller shaft 64 that is supported to be rotatable about a horizontal-axis. The propeller shaft 64 is connected with the propeller 18 at one end to transmit the power from the engine 52 to the propeller 18, and a transmission 66 installed between the engine 52 and the propeller shaft 64 and equipped with a plurality of gears including first and second speed gears.

An axis 64a of the propeller shaft 64 is approximately parallel to the forward moving direction of the boat 1 in the initial state of the power tilt/trim unit 50 (when the trim angle is equal to an initial angle). The transmission 66 comprises a transmission mechanism 68 adapted to shift among a plurality of gears and a shift mechanism 70 adapted to select a shift position from among a forward, reverse and neutral positions.

The transmission mechanism 68 is a parallel-axis type conventional stepped gear ratio transmission mechanism comprising an input shaft 72 connected to a crankshaft (not shown) of the engine 52, a countershaft 74 connected to the input shaft 72 through a gear and an output shaft 76 connected to the countershaft 74 through a plurality of gears, all disposed parallel to each other.

The countershaft 74 is connected to a hydraulic oil pump 78 adapted to supply hydraulic oil (lubricant) to hydraulic clutch for shifting and lubricant-requiring portions. A case 80 accommodates the input shaft 72, countershaft 74, output shaft 76 and oil pump 78 inside it and the lower portion of the case 80 functions as an oil pan 80a.

The shift mechanism 70 comprises a drive shaft 70a connected to the output shaft 76 of the transmission mechanism 68 to be rotatable about a vertical-axis, forward and reverse bevel gears 70b and 70c rotatably connected to the drive shaft 70a, and a clutch 70d adapted to mesh the propeller shaft 64 to the forward or reverse bevel gear 70b or 70c.

The engine cover 20 accommodates an electric shifting motor 82 for driving the shift mechanism 70 in its interior space. An output shaft of the electric shifting motor 82 is adapted to be connected to the upper end of a shift rod 70e of the shift mechanism 70 through a speed reduction gear mechanism 84. Therefore, the shift rod 70e and a shift slider 70f are displaced appropriately by driving the electric shifting motor 82 thereby operating the clutch 70d to select the shift position from among the forward, reverse and neutral positions.

When the shift position is the forward or reverse position, the rotation of the output shaft 76 of the transmission mechanism 68 is transmitted to the propeller shaft 64 through the shift mechanism 70 thereby rotating the propeller 18 to produce propelling power (driving force) to move the boat 1 forward or backward. The outboard motor 12 has a power source such as a battery (not shown) for powering the aforesaid electric motors 44, 60, 82 and the like installed to the engine 52.

As shown in FIG. 3, a throttle opening sensor 90 is installed near the throttle valve 58 to produce an output or signal indicating a throttle opening of the throttle valve 58. A crank angle sensor 94 is installed near the crankshaft of the engine 52 to produce a pulse signal at every predetermined crank angle, and a manifold absolute pressure sensor 96 is installed at an appropriate location of the air intake pipe 54 of the engine 52 to produce an output or signal indicative of manifold absolute pressure (negative pressure of engine) in the air intake pipe 54.

A trim angle sensor 98 is installed near the tilting shaft 16 to produce an output or signal corresponding to the trim angle of the outboard motor 12 (rotation angle of the outboard motor 12 about a pitch-axis relative to the hull 10).

In addition, as shown in FIG. 1, the apparatus according to this embodiment comprises an operator transmitter 100 that is wearable by the operator A seated in the cockpit 24 and transmits a radio-wave signal of a predetermined strength, a passenger transmitter 102 that is wearable by the passenger B seated in the passenger seat 26 and transmits a radio-wave signal of a predetermined strength (same as that of the operator transmitter 100), and a receiver 104 installed in the cockpit 24 of the hull 10 that receives the radio-wave signals transmitted by the operator transmitter 100 and the passenger transmitter 102. Although not illustrated, the operator transmitter 100 and passenger transmitter 102 are shaped like wristbands, for example, that the wearers can fit on their wrists.

Figure 4:
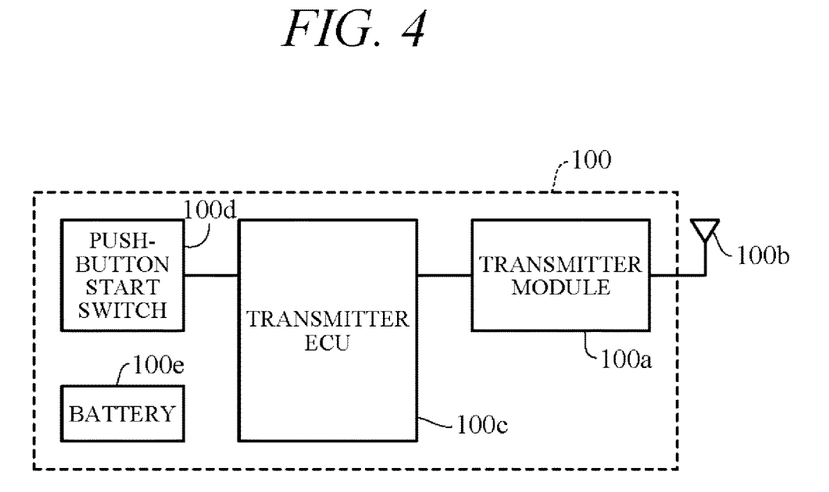
FIG. 4 is a block diagram showing the structure of an operator transmitter of FIG. 1.
Figure 5:
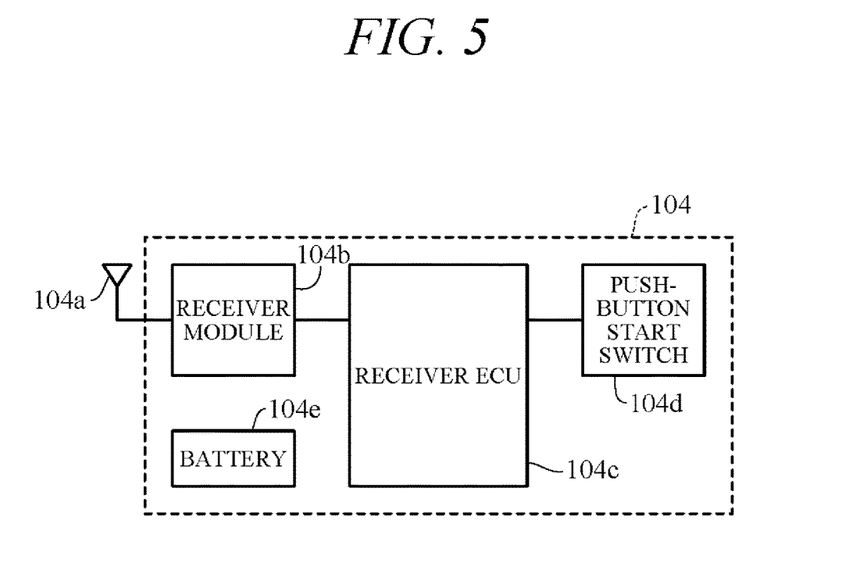
FIG. 5 is a block diagram showing the structure of a receiver of FIG. 1.

FIG. 4 is a block diagram showing the structure of the operator transmitter 100 and FIG. 5 is a block diagram showing the structure of the receiver 104.

As shown in FIG. 4, the operator transmitter 100 comprises a transmitter module 100a that generates a transmission radio wave, a transmitting antenna 100b connected to transmitter module 100a that transmits the generated radio wave in all directions, a transmitter ECU (electronic control unit) 100c that controls operation of the transmitter module 100a, a push-button start switch 100d, and a battery 100e. Although not illustrated, the structure of the passenger transmitter 102 is the same as that shown in FIG. 4.

Further, as shown in FIG. 5, the receiver 104 comprises a receiving antenna 104a that receives radio waves transmitted from the operator transmitter 100 (102), a receiver module 1004b that processes radio waves received by the receiving antenna 104a, a receiver ECU (electronic control unit) 104c that controls operation of the receiver module 1004b, a push-button start switch 104d, and a battery 104e.

The radio-wave signal transmitted from the operator transmitter 100 and passenger transmitter 102 and received by the receiver 104 is of a predetermined strength of, for example, 10 mW and frequency of, for example, around 2.4 GHz, and carries physiological parameter signals indicating a physiological parameter of the operator and the passenger (such as heart rate measured by a sensor adhered to the body).

Returning to the explanation of FIG. 1, the outputs of the receiver ECU 104c of the receiver 104 are sent through a cable 106 to the ECU 22 of the outboard motor 12. Instruments 110, a display 112 and audio equipment 114 are provided in the cockpit 24.

Although the operator transmitter 100 and the passenger transmitter 102 transmit radio waves of the same strength, since the receiver 104 is located in the cockpit 24, the radio wave transmitted from the operator transmitter 100 is stronger than the radio wave transmitted from the passenger transmitter 102. Therefore, by comparing the strengths of the radio waves, the ECU 22 can discriminate or identify whether a radio-wave signal received by the receiver 104 is a radio-wave signal from the operator transmitter 100 worn by the operator or a radio-wave signal from the passenger transmitter 102 worn by the passenger.

Based on received sensor outputs, etc., the ECU 22 controls operation of the engine 52, the electric motors 44, 60 and 82, the transmission 66 and the power tilt-trim unit 50, and also performs an emergency stop control action of the boat 1 upon occurrence of an emergency on the part of the operator or the passenger.

Figure 6:
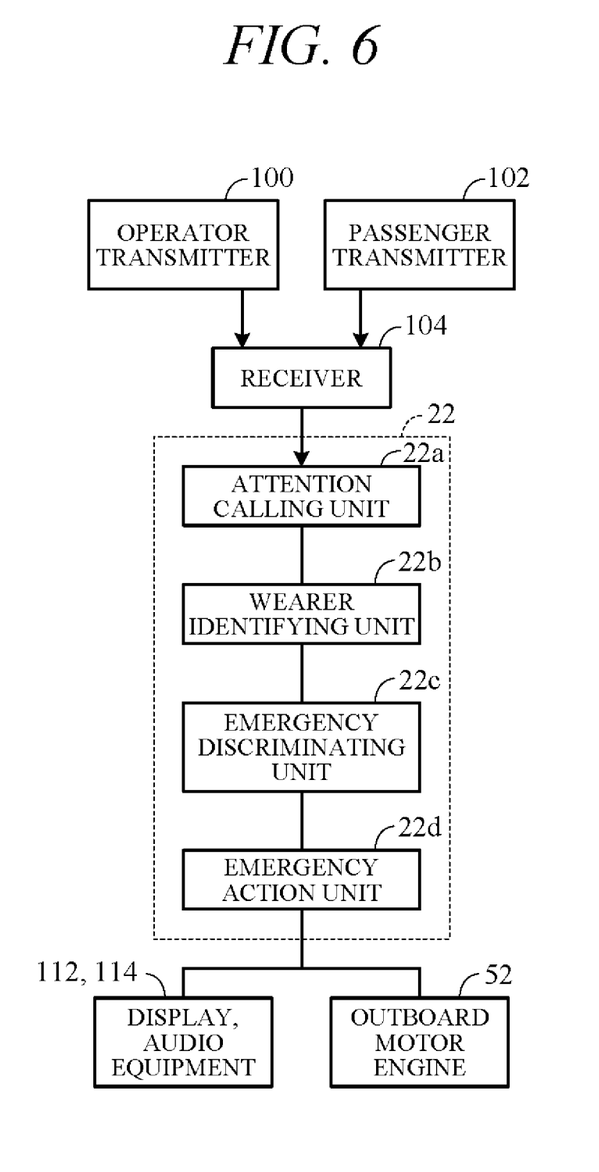
FIG. 6 is a block diagram functionally illustrating structure of the emergency stop apparatus according to the embodiment.

FIG. 6 is a block diagram functionally illustrating structure of the emergency stop apparatus according to the embodiment.

Now to explain, the ECU 22 comprises an attention calling unit 22a (calling means) that calling an attention to the operator and the passenger to check the operator transmitter 100 and the passenger transmitter 102, a wearer identifying unit (identifying means) 22b that identifies which of the operator and passenger is a wearer of the transmitter 100 (102) that transmits the radio-wave signal and received by the receiver between the radio-wave signal transmitted from the operator transmitter 100 and the radio-wave signal transmitted from the passenger transmitter 102, an emergency discriminating unit (discriminating means) 22c that discriminates whether strength of a radio-wave signal received by the receiver 104 and identified by the wearer identifying unit 22a is smaller than a predetermined value and upon discriminating that it is smaller than the predetermined value, discriminates that an emergency occurred, and an engine stop unit (stop means) 22d that upon discrimination of occurrence of an emergency by the emergency discriminating unit 22b performs in accordance with the identification result of the wearer identifying unit 22a either an engine stop action for stopping the engine 52 of the outboard motor 12 or an engine speed reduction action for reducing speed of the engine 52 of the outboard motor 12.

Figure 7:
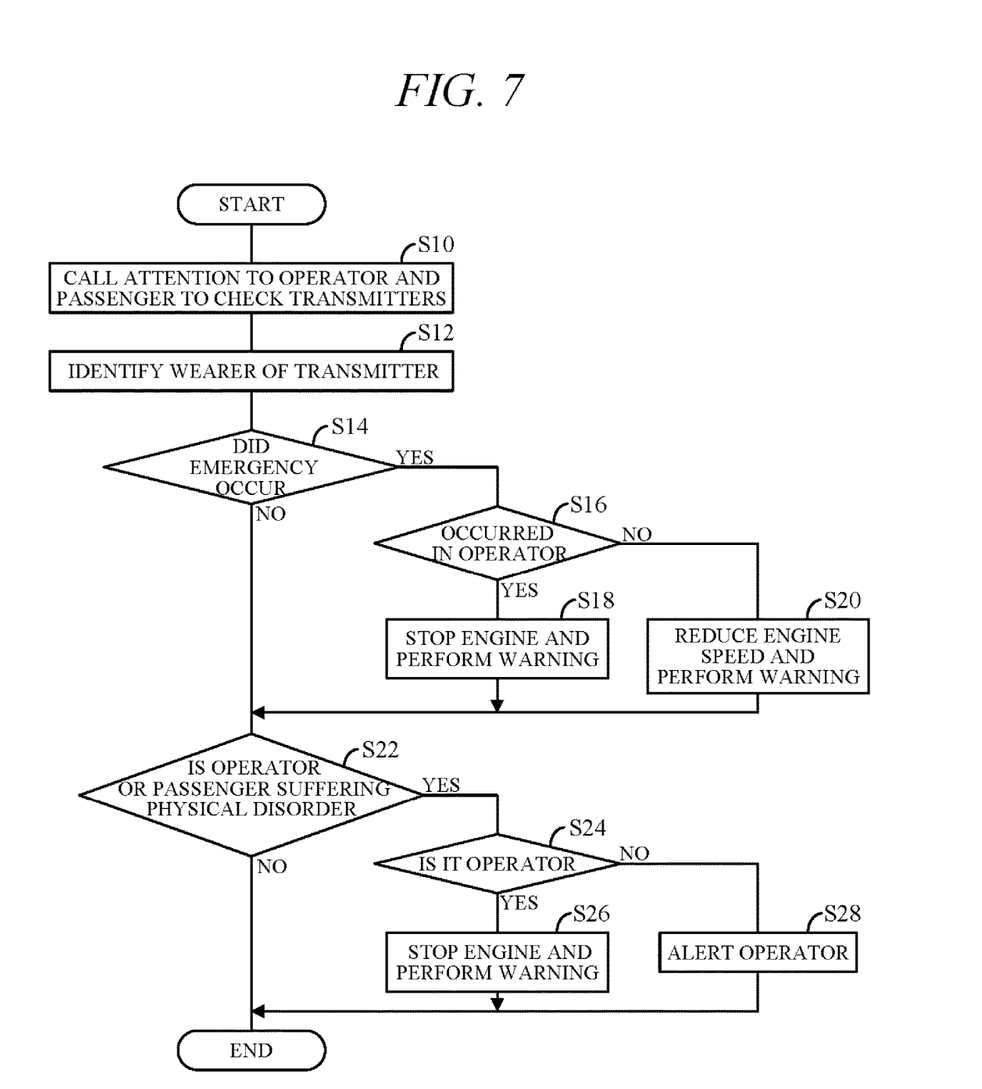
FIG. 7 is a flowchart concretely illustrating operation of the emergency stop apparatus of FIG. 6.

FIG. 7 is a flowchart concretely illustrating operation of the emergency stop apparatus of FIG. 6. The indicated program is periodically executed at predetermined time intervals.

Now to explain, in S10, a transmitter check is performed (S: processing Step). This is actually carried out by using the display 112 and audio equipment 114 provided in the cockpit 24 to urge the operator and passenger to check the transmitters 102 and 104, such as by issuing text and oral messages to the effect of: "Are the operator and passenger wearing transmitters? Are the batteries sufficiently charged?"

Thus, this amounts to call an attention to the operator and the passenger to check the operator transmitter 100 and passenger transmitter 102.

Next, in S12, the transmitter wearers are identified. Since the radio wave transmitted from the operator transmitter 100 is stronger than the radio wave transmitted from the passenger transmitter 102, this processing, done by the wearer identifying unit 22a, is performed in the wearer identifying unit 22a by comparing the strengths of the radio waves of the transmitters 100 and 102 received by the receiver 104.

This amount to identify which of the operator and the passenger is a wearer of the transmitter 100 (102) that transmits the radio-wave signal and received by the receiver 104 between the radio-wave signal transmitted from the operator transmitter 100 and the radio-wave signal transmitted from the passenger transmitter 102.

Next, in S14, it is discriminated by the emergency discriminating unit 22b whether an emergency occurred. Specifically, this processing done by the emergency discriminating unit 22b, is by discriminating whether the strength of a radio-wave signal received by the receiver 104 and identified by the wearer identifying unit 22a is smaller than the predetermined value and upon discriminating that it is smaller than the predetermined value, discriminates that an emergency such as overboard occurred in the identified wearer.

Here, the degree to which the radio wave is weakened by immersion of the transmitters 100 and 102 in water when the wearer falls overboard is empirically determined in advance and the predetermined value is defined as a value adequate for discriminating such immersion.

When the result in S14 is YES, the program goes to S16, in which it is determined whether the person discriminated to have encountered an emergency (fallen overboard) is the operator. When the result in S16 is YES, the program goes to S18, in which an engine stop action for stopping the engine 52 of the outboard motor 12 is performed by turning OFF (opening) its ignition circuit, and when NO, goes to S20, in which an engine speed reduction action for reducing speed (slowing down rotation) of the engine 52 is performed by operating the throttle electric motor 60 to drive the throttle valve 58 in the direction of closing throttle opening.

The processing of S16 to S20 is performed by the engine stop unit 22d, and when the emergency discriminating unit 22b in this way discriminates that an emergency occurred, the engine stop unit 22c performs in accordance with the identification result of the wearer identifying unit 22b either an engine stop action for stopping the engine 52 of the outboard motor 12 or an engine speed reducing action for reducing the speed of the engine 52 of the outboard motor 12.

When the engine stop unit 22d performs an action to stop the engine 52 in S18 or an action to reduce the engine speed in S20, it lights a warning lamp on the display 112 and operates the audio equipment 114, to visibly and audibly alert the operator A and passenger B to the stopping or other operation.

Owing to the processing as explained in the foregoing, when boat navigation becomes impossible owing to the operator having fallen overboard, the boat 1 can be stopped by stopping the engine 52, thereby facilitating rescue of the operator. On the other hand, boat navigation remains possible when the passenger falls overboard, so that immediate turn about for going the passenger's rescue is made possible by reducing the speed of the engine 52 but not stopping it. Moreover, since an alert is simultaneously issued, the boat operator or passenger can be surely made aware of the occurrence of such situations.

Next, in S22, whether the operator A or the passenger B is suffering a physical disorder (abnormal condition) is determined or discriminated from the physiological parameter signals included in the received radio-wave signals. The same applies when the result in S14 is NO. When the result in S22 is NO, subsequent processing is skipped, and when YES, the program goes to S24, in which it is determined whether the person discriminated to have a physical disorder is the operator.

When the result in S24 is YES, the program goes to S26, in which an engine stop operation is performed for stopping the engine 52, and the passenger is alerted by means of the display 112 and the audio equipment 114. On the other hand, when the result in S24 is NO, the program goes to S28, in which the operator is alerted by means of the display 112 and the audio equipment 114.

In other words, since navigation becomes impossible when the person determined to have a physical disorder is the operator, the engine 52 is stopped and rescue is awaited with the boat 1 kept stopped, but when the person is the passenger, since navigation remains possible, no engine speed reduction operation is performed and the operator is enabled to return to port or take some other measure as soon as possible. Moreover, the operator or passenger can be surely made aware of the situation that occurred by the alert issued simultaneously.

As stated above, the embodiment is configured to have an emergency stop apparatus and method for a small boat (1) having an outboard motor (12) mounted on a hull (10) and equipped with an internal combustion engine (52) to power a propeller (18) to propel the hull forward, a cockpit (24) installed in the hull for seating an operator (boat operator) (A) of the boat, and a passenger seat (26) installed in the hull at a position spaced apart from the cockpit for seating a passenger (B) of the boat, comprising: an operator transmitter (100) that is wearable by the operator (A) and transmits a radio-wave signal of a predetermined strength; a passenger transmitter (102) that is wearable by the passenger (B) and transmits a radio-wave signal of the predetermined strength same as that of the operator transmitter (100); a receiver (104) that is installed on the hull (10) at a location closer to the cockpit than the passenger seat and receives the radio-wave signals transmitted by the operator transmitter (100) and the passenger transmitter (102) successively; a wearer identifying unit (22b, S12) that identifies which of the operator and the passenger is a wearer of the transmitter that transmits the radio-wave signal and received by the receiver between the radio-wave signal transmitted from the operator transmitter (100) and the radio-wave signal transmitted from the passenger transmitter (102); an emergency discriminating unit (22c, S14) that discriminates whether strength of the radio-wave signal transmitted from the wearer identified by the wearer identifying unit (22b) is smaller than a predetermined value and discriminates that an emergency occurred in the wearer when it is discriminated that the strength of the ratio-wave signal transmitted from the wearer is smaller than the predetermined value; and an emergency action unit (22d, S16-S28) that performs an emergency action comprised of an engine stop action for stopping the engine (52) of the outboard motor (12) or engine speed reducing action for reducing speed of the engine of the outboard motor when it is discriminated by the emergency discriminating unit that the emergency occurred in the wearer.

With this, by identifying which of the operator and the passenger experienced an emergency, an appropriate response becomes possible, such as by stopping the engine 52 to stop the boat 1 when an emergency on the part of the operator is discriminated and by performing an action such as reducing engine speed to decelerate the boat 1 when an emergency on the part of the passenger is discriminated.

More specifically, various appropriate responses become possible, such as by stopping the engine 52 to stop the boat 1 when boat navigation becomes impossible owing to the operator having fallen overboard or experienced some other emergency, or by slowing down, not stopping, the engine 52 when the passenger experiences an emergency, thereby enabling the operator to immediately turn about and rescue the passenger.

In the apparatus and method, the emergency action unit (22d) performs the engine stop action when it is discriminated by the emergency discriminating unit that that emergency occurred in the operator (S18).

With this, it becomes possible to immediately rescue the operator by stopping the engine 52 to stop the boat 1 when the operator having fallen overboard or experienced some other emergency.

In the apparatus and method, the emergency action unit (22d) performs the engine speed reducing action when it is discriminated by the emergency discriminating unit that that emergency occurred in the passenger. (S20)

With this, by slowing down, not stopping, the engine 52, it becomes possible for the operator to immediately turn about the boat and rescue the passenger when the passenger having fallen overboard In the apparatus and method, the receiver (104) is installed in the cockpit (24) and the wearer identifying unit (22b) identifies the wearer by discriminating whether the radio-wave signal received by the receiver (104) is the radio-wave signal transmitted from the operator transmitter (100) or the radio-wave signal transmitted from the passenger transmitter (102) based on the strength of the radio-wave signal received by the receiver (104).

With this, in addition to the effects mentioned above, since it is not necessary to make the radio-wave signals different for different wearer. As a result, it becomes possible to identify the wearer with less complicated structure.

In the apparatus and method, the operator transmitter (100) and the passenger transmitter (102) transmit the radio-wave signals that carry physiological parameter signals of the operator and the passenger, and the emergency action unit (22d) performs the emergency action when it is determined from the physiological parameter signals that the operator or the passenger suffers a physical disorder (S22-S28).

With this, an appropriate response becomes possible, such as by stopping the engine 52 to stop the boat 1 when the operator is determined to suffer a physical disorder, since it becomes no longer possible to navigate the boat. On the other hand, when the passenger is determined to suffer a physical disorder, since boat navigation is still possible, not taking an action such as reducing engine speed to decelerate the boat 1, but alerting the operator to that effect, it becomes possible to immediately take an action such as to return port.

In the apparatus and method, the emergency action unit (22d) performs the engine stop action when it is determined that the operator suffers a physical disorder (S26).

With this, since navigation becomes impossible when the person determined to have a physical disorder is the operator, the engine 52 is stopped and rescue is awaited with the boat 1 kept stopped. Thus, an appropriate response becomes possible In the apparatus and method, the emergency action unit (22d) alerts the operator when it is determined that the passenger suffers a physical disorder (S28).

With this, when the person is the passenger, since navigation remains possible, no engine speed reduction operation is performed and the operator is enabled to return to port or take some other measure as soon as possible. Moreover, the operator or passenger can be surely made aware of the situation that occurred by the alert issued simultaneously.

The apparatus and method further include: an attention calling unit (22a, S10) that calling an attention to the operator and the passenger to check the operator transmitter (100) and the passenger transmitter (102).

With this, it becomes possible to avoid problem of the emergency stop feature not working owing to, for example, the power or a switch of a radio transmitter being inadvertently being left OFF.

It should be noted in the above that, although the number of passenger is two, the number of the passenger can be two or more.

It should further be noted that, although a pleasure boat, namely, a motor boat, is exemplified as a small boat in the foregoing, this invention is not limited to such an application but can also be applied to fishing boats and various other watercraft.

While the present invention has been described with reference to the preferred embodiments thereof, it will be understood, by those skilled in the art, that various changes and modifications may be made thereto without departing from the scope of the appended claims.

What is claimed is:

1. An emergency stop apparatus for a small boat having an outboard motor mounted on a hull and equipped with an internal combustion engine to power a propeller to propel the hull forward, a cockpit installed in the hull for seating an operator of the boat, and a passenger seat installed in the hull at a position spaced apart from the cockpit for seating a passenger of the boat, comprising:
    an operator transmitter that is wearable by the operator and transmits a radio-wave signal of a predetermined strength;
    a passenger transmitter that is wearable by the passenger and transmits a radio-wave signal of the predetermined strength same as that of the operator transmitter;
    a receiver that is installed on the hull at a location closer to the cockpit than the passenger seat and receives the radio-wave signals transmitted by the operator transmitter and the passenger transmitter successively;
    a wearer identifying unit that identifies which of the operator and the passenger is a wearer of the transmitter that transmits the radio-wave signal and received by the receiver between the radio-wave signal transmitted from the operator transmitter and the radio-wave signal transmitted from the passenger transmitter;
    an emergency discriminating unit that discriminates whether strength of the radio-wave signal transmitted from the wearer identified by the wearer identifying unit is smaller than a predetermined value and discriminates that an emergency occurred in the wearer when the strength of the ratio-wave signal transmitted from the wearer is smaller than the predetermined value; and
    an emergency action unit that performs an emergency action comprised of an engine stop action for stopping the engine of the outboard motor or an engine speed reducing action for reducing speed of the engine of the outboard motor when it is discriminated by the emergency discriminating unit that the emergency occurred in the wearer.

2. The apparatus according to claim 1, wherein the emergency action unit performs the engine stop action when it is discriminated by the emergency discriminating unit that the emergency occurred in the operator.

3. The apparatus according to claim 1, wherein the emergency action unit performs the engine speed reducing action when it is discriminated by the emergency discriminating unit that the emergency occurred in the passenger.

4. The apparatus according to claim 1, wherein the receiver is installed in the cockpit and the wearer identifying unit identifies the wearer by discriminating whether the radio-wave signal received by the receiver is the radio-wave signal transmitted from the operator transmitter or the radio-wave signal transmitted from the passenger transmitter based on the strength of the radio-wave signal received by the receiver.

5. The apparatus according to claim 1, wherein the operator transmitter and the passenger transmitter transmit the radio-wave signals that carry physiological parameter signals of the operator and the passenger, and
    the emergency action unit performs the emergency action when it is determined from the physiological parameter signals that the operator or the passenger suffers a physical disorder.

6. The apparatus according to claim 5, wherein the emergency action unit performs the engine stop action when it is determined that the operator suffers a physical disorder.

7. The apparatus according to claim 5, wherein the emergency action unit alerts the operator when it is determined that the passenger suffers a physical disorder.

8. The apparatus according to claim 1, further including:
    an attention calling unit that calls an attention to the operator and the passenger to check the operator transmitter and the passenger transmitter.

9. An emergency stop method for a small boat having an outboard motor mounted on a hull and equipped with an internal combustion engine to power a propeller to propel the hull forward, a cockpit installed in the hull for seating an operator of the boat, a passenger seat installed in the hull at a position spaced apart from the cockpit for seating a passenger of the boat, an operator transmitter that is wearable by the operator and transmits a radio-wave signal of a predetermined strength; a passenger transmitter that is wearable by the passenger and transmits a radio-wave signal of the predetermined strength same as that of the operator transmitter; and a receiver that is installed on the hull at a location closer to the cockpit than the passenger seat and receives the radio-wave signals transmitted by the operator transmitter and the passenger transmitter successively; comprising the steps of:

identifying which of the operator and the passenger is a wearer of the transmitter that transmits the radio-wave signal and received by the receiver between the radio-wave signal transmitted from the operator transmitter and the radio-wave signal transmitted from the passenger transmitter;

discriminating whether strength of the radio-wave signal transmitted from the identified wearer is smaller than a predetermined value and discriminates that an emergency occurred in the wearer when the strength of the ratio-wave signal transmitted from the wearer is smaller than the predetermined value; and     performing an emergency action comprised of an engine stop action for stopping the engine of the outboard motor or engine speed reducing action for reducing speed of the engine of the outboard motor when it is discriminated by the step of emergency discriminating that the emergency occurred in the wearer.

10. The method according to claim 9, wherein the step of emergency action performs the engine stop action when it is discriminated by the step of emergency discriminating that the emergency occurred in the operator.

11. The method according to claim 10, wherein the step of emergency action performs the engine speed reducing action when it is discriminated by the step of emergency discriminating that the emergency occurred in the passenger.

12. The method according to claim 9, wherein the receiver is installed in the cockpit and the step of wearer identifying identifies the wearer by discriminating whether the radio-wave signal received by the receiver is the radio-wave signal transmitted from the operator transmitter or the radio-wave signal transmitted from the passenger transmitter based on the strength of the radio-wave signal received by the receiver.

13. The method according to claim 9, wherein the operator transmitter and the passenger transmitter transmit the radio-wave signals that carry physiological parameter signals of the operator and the passenger, and     the step of emergency action performs the emergency action when it is determined from the physiological parameter signals that the operator or the passenger suffers a physical disorder.

14. The method according to claim 13, wherein the step of emergency action performs the engine stop action when it is determined that the operator suffers a physical disorder.

15. The method according to claim 13, wherein the step of emergency action alert the operator when it is determined that the operator suffers a physical disorder.

16. The method according to claim 9, further including the step of:

calling an attention to the operator and the passenger to check the operator transmitter and the passenger transmitter.

\* \* \* \* \*